(No Model.)
M. WESTBROOK.
BICYCLE.
No. 511,479. Patented Dec. 26, 1893.
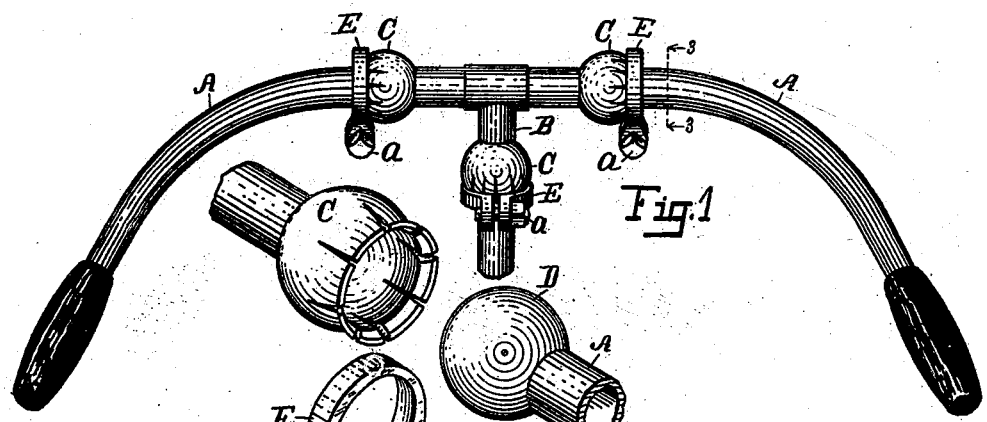
Fig. 1
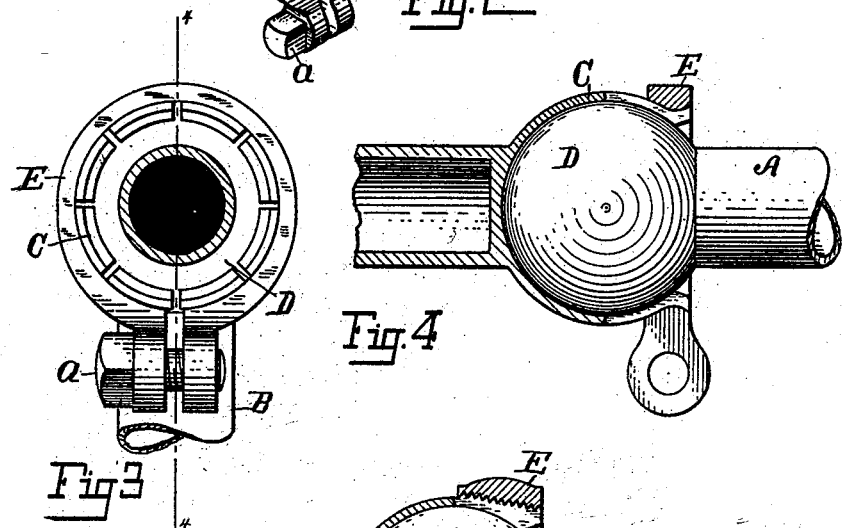
Fig. 2
Fig. 3
Fig. 4
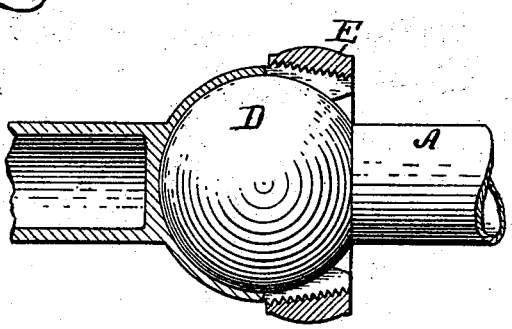
Fig. 5
Witnesses:
Walter S. Wood
C. E. Westbrook
Inventor.
Milton Westbrook
By Fred L. Chappell
Att'y.
THE NATIONAL LITHOGRAPHING COMPANY,
WASHINGTON, D. C.

UNITED STATES PATENT OFFICE.

MILTON WESTBROOK, OF KALAMAZOO, MICHIGAN.

BICYCLE.

SPECIFICATION forming part of Letters Patent No. 511,479, dated December 26, 1893.

Application filed September 26, 1893. Serial No. 486,529. (No model.)

*To all whom it may concern:*

Be it known that I, MILTON WESTBROOK, a citizen of the United States, residing at the city of Kalamazoo, in the county of Kalamazoo and State of Michigan, have invented certain new and useful Improvements in Bicycles, of which the following is a specification.

My invention relates to improvements in bicycles and more particularly to the handle-bars and post.

The object of my invention is to provide a post and handle bars that shall be completely adjustable, so that the rider can place the handles so that they will be in convenient reach when he sits erect in the saddle when riding on easy roads, and so that they can be adjusted to a suitable height and position for heavy work as on country roads, in climbing hills or in racing.

Another secondary object is to provide a joint that can be adjusted so that it will yield before the handle bar will bend under heavy work and so save damage to the machine.

I accomplish these objects by the device shown in the accompanying drawings, in which—

Figure 1, is a view of the handle bars and a portion of the post of a bicycle embodying my invention, removed from the machine. Fig. 2, shows details of all of the parts of one of the joints separated. Fig. 3 is an enlarged sectional view on line 3—3 of Fig. 1, looking in the direction of the arrows. Fig. 4, is a view partly in section on line 4—4 of Fig. 3. Fig. 5, is a view on line 4—4 of Fig. 3, showing a modified construction.

Similar letters of reference refer to similar parts throughout the several views.

I accomplish the objects of my invention by means of adjustable universal joints in each handle bar and in the post of a bicycle.

In the drawings, A, A, are the handle bars and B is the post. The universal joints in each are the same and are constructed by dividing the handle bar or post as the case may be, expanding a portion into a ball socket C, open at the end and forming the other portion into a ball that exactly fits the socket. The walls of the socket are thin enough to be slightly flexible and deep narrow notches are cut from the front back to the middle of each socket. The outer end of the socket is expanded a little so that a crease or groove is formed to receive and retain the band E which is drawn tight around the socket by means of the screw $a$. When the joint is fitted carefully by grinding or otherwise the screw $a$ can be tightened so that the handle bar A will bend before the joint will yield at all.

In Fig. 5 a modified form of my improved joint is used. The socket C is notched the same as before and screw threads are cut on the front part. The band E is made in the form of a ring with screw threads cut inside and is screwed onto the front of the socket and tightens the joint in that way.

I desire to say that other means of tightening the joint may be employed but I have shown the most approved means.

With the post and handle bar constructed as I have shown it will be readily seen that the post can be tipped forward and back and secured and that the handles can be bent forward and back or up and down or can be twisted in the socket to any position desired and then be secured there. It will be readily seen that the brake rods of a bicycle can be adjusted in this same way so that no other special change will be required in their construction.

Having thus described my invention, what I claim, and desire to secure by Letters Patent, is—

1. A bicycle with its post and handle bars each containing an adjustable universal joint, composed of socket C, ball D and securing band E, substantially as described for the purpose specified.

2. A bicycle with its post and handle bars each containing an adjustable universal joint for the purpose set forth.

3. In a bicycle the handle bars in combination with an adjustable universal jointed post for the purpose specified.

4. In a bicycle the handle bars each containing an adjustable universal joint composed of socket C, ball D, and securing band E, for the purpose specified.

5. In a bicycle the handle bars each containing an adjustable universal joint for the purpose specified.

6. In a bicycle the handle bars in combination with a post containing a universal joint composed of the socket C, the ball D and the band E for the purpose specified.

In witness whereof I have hereunto set my hand and seal in the presence of two witnesses.

MILTON WESTBROOK. [L. S.]

Witnesses:
C. E. WESTBROOK,
E. S. ROOS.